(No Model.)
C. H. BIGGS.
SELF MOUSING HOOK.
No. 520,721. Patented May 29, 1894.
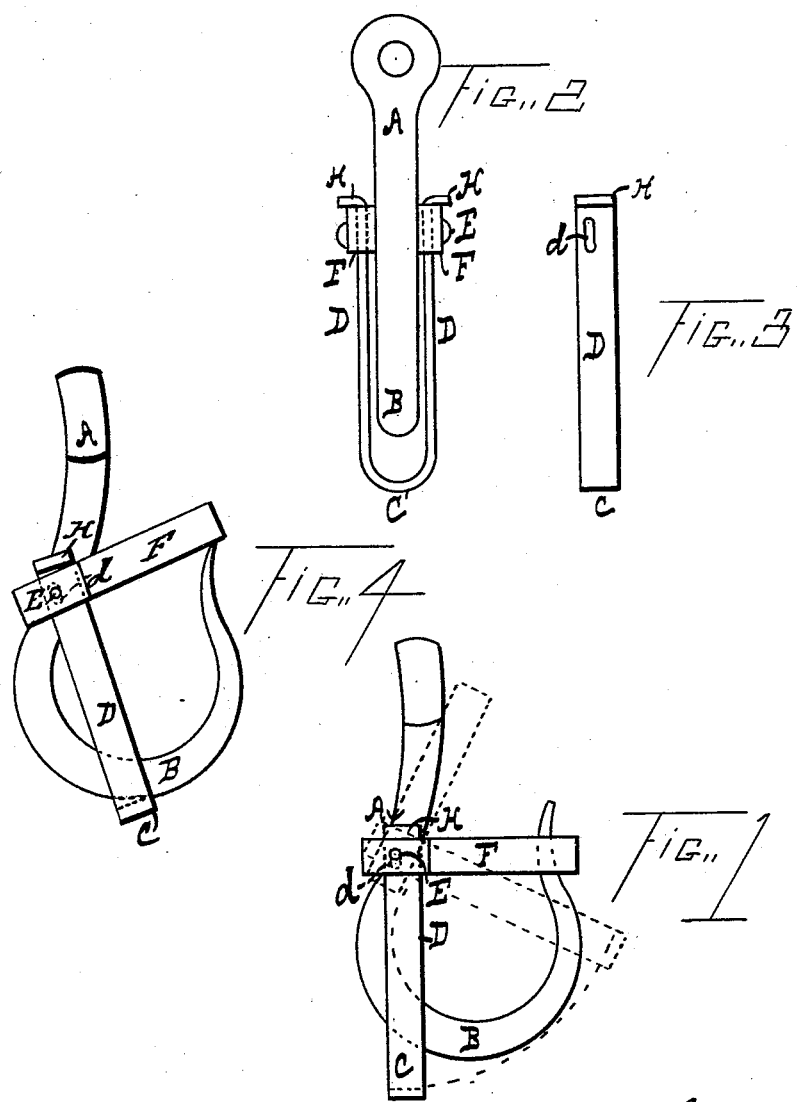
Witness
Gertrude H. Anderson
Geo. H. Lothrop
Inventor
Charles H. Biggs

UNITED STATES PATENT OFFICE.

CHARLES H. BIGGS, OF DETROIT, MICHIGAN.

SELF-MOUSING HOOK.

SPECIFICATION forming part of Letters Patent No. 520,721, dated May 29, 1894.

Application filed March 25, 1893. Renewed March 26, 1894. Serial No. 505,198. (No model.)

*To all whom it may concern:*

Be it known that I, CHARLES H. BIGGS, of Detroit, in the county of Wayne and State of Michigan, have invented a new and useful Improvement in Self-Mousing Hooks, of which the following is a specification.

My invention consists in an improved self mousing hook, hereinafter fully described and claimed.

Figure 1 is a side elevation showing the hook moused. Fig. 2 is a rear elevation. Fig. 3 is an elevation of one-half of the locking loop, and Fig. 4 shows the parts in locked position.

A and B respectively represent the shank and bend of a hook. E represents a pin through the hook nearly opposite the point thereof.

D represents a loop which may be made of sheet metal, whose ends are turned outwardly as shown at H, and which is provided with a slot $d$ to engage with pin E, and the length of the loop D is such that when the pin E lies in that part of slot $d$ which is nearest the upturned shoulder H, the bend C of said loop will just clear the rounding end of the hook, while when the pin E is at or near the other end of slot $d$ the bend C will strike against the bend B of the hook as shown in Fig. 4.

F represents a loop pivoted on pin E and made just long enough to pass over the point of the hook as shown in Figs. 1 and 4. The loop F may pass down on the outside of the loop D, as shown in Figs. 2 and 4, or it may pass down inside of loop D and then be turned over said loop extending upward outside thereof as shown in Figs. 2 and 4.

The operation of my invention is as follows: If the loops D and F are in the position shown in dotted lines in Fig. 1, a line or eye may be slipped into the hook, and the effect of strain on said line or eye will be to draw the loop D into the position shown in full lines in Fig. 1, thus bringing by means of shoulder H, the loop F first into the position shown in Fig. 4 and then in the position shown in Fig. 1, in full lines, in which position the hook is moused. Now by applying force to loop D and drawing it in such manner that the pin E lies in slot $d$ near shoulder H, said loop may be swung around the bend B of the hook as shown in dotted lines in Fig. 1, to open the loop F. But if force be applied to loop F, as by a line or eye held in the hook seeking to escape, the sides of loop F strike against the shoulder H and the first motion of loop F slides loop D along its pivot E until said pivot lies at or near the end of slot $d$ farthest from the shoulder H, in which position the end C of loop D, will not clear the hook B, prevents loop F from moving, and therefore prevents the escape of a line held in said hook. As the principle of this locking device is the sliding action of loop D which really makes the connection between said loop and the hook A, B, an eccentric connection, it is evident that the form and proportion of loops F and D may be changed or modified in any desired manner so long as this principle is retained.

What I claim as my invention, and desire to secure by Letters Patent, is—

1. In combination with a hook and a pivot in said hook a loop having a sliding connection with said pivot and adapted to extend over the end of the hook, and a mousing loop pivoted on said pivot and adapted when moved to engage with and move said sliding loop, substantially as shown and described.

2. The combination with a hook A B having a pin E, of a loop D having upturned shoulders H and slots $d$ which engage said pin, and a mousing F pivoted on the pin and adapted to engage with said shoulders, substantially as shown and described.

CHARLES H. BIGGS.

Witnesses:
GERTRUDE H. ANDERSON,
GEO. H. LOTHROP.